`US007823380B2`

(12) United States Patent
Ghouse (10) Patent No.: US 7,823,380 B2
(45) Date of Patent: Nov. 2, 2010

(54) FREE FLOATING WAVE ENERGY CONVERTER

(76) Inventor: Syed Mohammed Ghouse, #11-4-636, AC Guards, Hyderabad (IN) 500 004

( * ) Notice: Subject to any disclaimer, the term of this patent is extended or adjusted under 35 U.S.C. 154(b) by 230 days.

(21) Appl. No.: 11/997,662

(22) PCT Filed: Aug. 1, 2006

(86) PCT No.: PCT/IN2006/000273
§ 371 (c)(1),
(2), (4) Date: Feb. 1, 2008

(87) PCT Pub. No.: WO2007/015269
PCT Pub. Date: Feb. 8, 2007

(65) Prior Publication Data
US 2008/0229745 A1 Sep. 25, 2008

(30) Foreign Application Priority Data
Aug. 2, 2005  (IN) .......................... 694/KOL/2005

(51) Int. Cl.
*F03B 13/18* (2006.01)
*F03B 17/02* (2006.01)
(52) U.S. Cl. ............... 60/499; 60/496; 60/497
(58) Field of Classification Search ............ 60/495–504
See application file for complete search history.

(56) References Cited
U.S. PATENT DOCUMENTS
3,335,667 A  8/1967  Murphy 4,163,633 A * 8/1979 Vriend ........................ 417/332

(Continued)

FOREIGN PATENT DOCUMENTS
GB    2024957 A    1/1980

(Continued)

OTHER PUBLICATIONS

MacMillin, David M., Ewbank's Hydraulics—Wirtz' Pump, Jun. 20, 1998, http://www.marcdatabase.com/~lemur/rbt-scoopwheel.html.*

(Continued)

*Primary Examiner*—Thomas E Denion
*Assistant Examiner*—Christopher Jetton
(74) *Attorney, Agent, or Firm*—Fraser Clemens Martin & Miller LLC; William J. Clemens (57) ABSTRACT

A wave energy converter includes a flexible pipe and an inlet. The flexible pipe floats on the water surface, following the wave form. Slugs of water and air enter, one after the other, through the inlet. Because the flexible pipe follows the shape of the wave, water is transported through a manifold to a pressure chamber connected to a generator. The inlet consists of a hollow, inflexible pipe attached to the throat of the flexible pipe. The inflexible pipe is fixedly attached to a buoyancy tank or plurality thereof. The buoyancy tanks are arranged in a vertical plane or in tandem, with the inflexible pipe passing along the plane vertical to the fore and aft axis of the buoyancy tank and the frontward portion projecting sufficiently ahead of the buoyancy tank with the flexible pipe terminating at a singular outlet. The entire apparatus is facing the oncoming waves.

20 Claims, 8 Drawing Sheets

FLEXIBLE PIPE "SLUGS UNDER PRESSURE"

U.S. PATENT DOCUMENTS

| | | | |
|---|---|---|---|
| 4,672,222 | A | 6/1987 | Ames |
| 5,808,368 | A * | 9/1998 | Brown .................. 290/53 |
| 2006/0090463 | A1 | 5/2006 | Burns et al. |

FOREIGN PATENT DOCUMENTS

| | | | |
|---|---|---|---|
| JP | 3151572 | A | 6/1991 |
| RU | 2004837 | C1 * | 12/1993 |
| SU | 1129407 | A1 | 12/1984 |
| WO | WO 84/00583 | A1 | 2/1984 |
| WO | WO 2006/067421 | A1 | 6/2006 |

OTHER PUBLICATIONS

MacMillin, David M., Ewbank's Hydraulics—Wirtz' Pump; Jun. 20, 1998, http://www.marcdatabase.com/~lemur/rbt-scoopwheel.html.*

Mortimer, G.H., The Coil Pump—Theory and Practice; Journal of Hydraulic Research, vol. 22 1984, No. 1, pp. 9-22.*

Database WPI; Section PQ, Week 198526; Derwent Publications Ltd., London, GB; Class Q55, AN 1985-158007; XP002372600 "Wave power installation guide—has ballast tank at start section of pipe and uniformly positioned check valves over pipe length to increase pressure head".

Database WPI, Week 199414; Derwent Publications Ltd., London, GB; Class Q55, AN 1994-116500; XP002406517 "Wave driven power generating unit—has meshed filter placed on conical headpiece, and anchor, and flexible sleeve made of separate sections connected to each other by flanges".

Q59MV3cANAL, Apr. 26, 2005. Retrieved from UNIPROT database, [retrieved online Jan. 2, 2007], http://www.ebi.uniprot.org/entry/Q59MV3cANAL.

AACQ01000216, May 4, 2004. Retrieved from the EBI/EMBL Database, [retrieved online on Jan. 2, 2004], http://www.ebi.ac.ukkgi-bin/excesvfetch?AACQ01000217.

Wilson, RB, Davis D, Mitchell AP, "Rapid hypothesis testing with Candida albicans through gene disruption with short homology regions." J. Bacteriol. Mar. 1999; 181(6): 1868-74.

Singh SR, Rekha N, Pillai B, Singh V. Naorem A, Sampath V, Srinivasan N, Sadhale PP, "Domainal organization of the lower eukaryotic homologs of the yeast RNA polymerase II core subunit Rpb7 reflects functional conservation." Nucleic Acids Res. Jan. 2, 2004:32(1): 201-10.

Romani et al., Adaptation of *Candida albicans* to the host environment: the role of morphogenesis in virulence and survival in mammalian hosts, Curr. Opin. Microbiol. 6: 338-343, 2003.

Rooney and Klein, Linking fungal morphogenesis with virulence, 2002, Cell Microbiol 4: 127-137.

Gow et al., Fungal morphogenesis and host invasion, 2002, Curr. Opin. Microbiol. 5: 366-371.

Morenoa et al., Characterization of a *Candida albicans* gene encoding a putative transcriptional factor required for cell wall integrity, FEMS Microbiol. Lett. 226, 159-167.

* cited by examiner

FIG. 2 (b) PREFERRED EMBODIMENT

FIG. 3 FLEXIBLE PIPE "SLUGS UNDER PRESSURE"

FIG. 4
SINGLE PIPE TYPE INLET

FIG. 5 - INLET VARIABLE BUOYANCY

FIGURE 6

601. INLET WITH INFLATABLE BUOYANCY TANK & CONTROL
602. INFLATABLE BUOYANCY TANK
603. INFLEXIBLE PIPE
604. FLEXIBLE PIPE
605. PNEUMATIC HOSE
606. PNEUMATIC DUCT
607. BRACKET
608. SUSPENSION ROD
609. BALLAST
610. MOORING RING
611. MOORING LINE

Fig. 7 INLET - INFLATABLE BUOYANCY TANK WITH CONTROL

FREE FLOATING WAVE ENERGY CONVERTER

FIELD OF THE INVENTION

This invention relates to ocean energy and more particularly wave energy converters (WEC). As against the rest of the state of the art WEC systems, which mostly capture energy from the undulations of waves or surge, almost all in the vertical axis, according to the present invention, energy is extracted from the wave propagation in the horizontal plane. A 'Flexible Pipe' floats on the surface of water and adapts to the waveform. Air and water are trapped in the pipe and segregated—due to gravity, into discrete segments or "Slugs" in the crests and troughs, respectively. The segments get pushed by the waves as they propagate from one end of it to the other. Thus, energy is extracted by virtue of the propagation of waves. The segments can flow even against pressure, if applied at the Outlet. The total pressure in a pipe will be the function of the cumulative differential pressure of all the water segments in that pipe—less losses.

BACKGROUND OF THE INVENTION

The Wave Energy Converter (WEC) has been known for many years, it was only during the last decade and a half or so that serious efforts were initiated towards exploiting it commercially. Several ocean wave energy conversion devices have since been developed, but only a few matured to full-scale trial stage, but none yet implemented fully on a commercial scale. The main disadvantage of the wave power is the uneconomical cost of extracting wave energy.

Although several Wave Energy Converters (WEC) and more than 1000 patents exist, none seem to have come up to the expectations. A truly economical and practicable solution is yet to be found. The major challenges with the state of the art WEC's have been their complexity and survivability, mainly due to the vagaries and harshness of the ocean. Solutions to such problems are being sought through improving the sophistication of the devices and making them more robust. This might improve the energy efficiency but not cost effectiveness—in terms of cost/kW, of the systems. Most importantly, none of the WEC today can perhaps be implemented with the resources readily available. They generally work with specialized and propriety technologies. Consequently, this approach increases the degree of difficulty in design, implementation, operations and maintenance of the equipment; which is quite contrary to what is required. As such, the state of the art WEC's are commercially unviable.

The World Energy Council estimates that 2 TW of energy could be harvested from the world's oceans, the equivalent of twice the world's electricity production. However, since waves are neither steady nor concentrated enough it has not yet been possible to extract and supply wave energy viably. The major problem with designing wave energy converters has been in handling the vast range of power variations in the ocean waves, from approximately average of 50 kW/m, peaking to 10 MW/m (a 1:200 ratio).

Further the focus has mostly been on improving efficiency of the devices—through ever more sophistication. As such, the state of the art, wave energy converters (WEC's) have become highly sophisticated, specialized and propriety technologies. This translates into cost escalation, besides increasing the degree of difficulty in implementation and maintenance. Most importantly, it is unlikely that of any WEC of today, can be implemented with generic resources. The devices might be highly sophisticated, even more energy efficient, but perhaps, not as cost effective—in terms of cost/kW.

Hence, a truly cost effective and simpler solution, which also offers a high degree of survivability, ease of implementation and maintenance, was required.

The present invention could possibly be the simplest and most cost effective solution, to the vexing problem of wave energy extraction and integration into the grid. As against this, the FFWEC operates on an entirely unique concept which makes it possibly the simplest and most cost effective solution yet for wave energy extraction and integration into the grid.

Most of the state of the art WEC's capture energy from the heaving motion of the waves, which is along the vertical axis. The ratio of the energy converted by most contemporary WEC's is generally a fraction of the total energy available in the wave. As against this, the FFWEC utilizes propagation of the waves along the horizontal axis.

Types of Wave Energy Converters: The state of the art power conversion devices have been generally classified into the following basic categories, namely:

Floats or Pitching Devices (Heaving buoys): These devices generate electricity from the bobbing or pitching action of a floating object. The object can be mounted to a floating raft or to a device fixed on the ocean floor. To generate large amounts of energy, a multitude of these devices must be deployed, each with its own piston and power take off equipment.

Oscillating Water Columns (OWC) These devices generate electricity from the wave-driven rise and fall of water in a cylindrical shaft. The rising and falling water column drives air in and out of the top of the shaft, powering an air-driven turbine.

Wave Surge or Focusing Devices (Overtopping): These shoreline devices, also called "tapered channel" or "tapchan" systems, rely on a shore-mounted structure to channel and concentrate the waves, driving them into an elevated reservoir. Water flow of this reservoir is used to generate electricity, using standard hydropower technologies.

Hinged Contour Converters: It is system of buoys consisting of tubular steel cylinders, attached to one another by hinges capable of interacting with a much large ocean area along its length. The force which the waves exert in moving each segment relative to its neighbors is captured by hydraulic rams that press fluid into accumulators, which, in turn, power a number of generators.

References is also made to U.S. Pat. No. 4,672,222 which provides an apparatus for producing electricity from wave motion on a body of water comprising of self stabilized and modularly expandable system of independently operative point absorbers with respective drive transmission and electrical generators.

It has, therefore, been long felt need to develop such wave energy converter, which overcomes the disadvantages of prior art, and energy is obtained at cheaper rate by simpler method and apparatus.

The present invention is quite unlike the rest of the state of the art systems. Its uniqueness lays mainly in its principle of operation, as against the rest of the state of the art WEC systems, which mostly capture energy from the undulations of waves in the vertical axis or surge, the FFWEC of the present invention extracts energy from the wave propagation in the horizontal plane.

Further, and most importantly, the FFWEC has no contacting components and moving part; besides the 'flexible pipe(s)' itself. Thus, the FFWEC is very simple in design, construction, operations, and easy to maintain.

SUMMARY OF THE INVENTION

The FFWEC of the present invention consists basically of flexible pipes which float on ocean waves and convert the horizontal or progressive wave motion directly into kinetic energy, by pumping or pushing air and water through the "Flexible Pipes", which can be employed to drive conventional hydroelectricity generators or pump ocean water into reservoirs, etc.

The FFWEC of the present invention basically consists a "Flexible Pipe" (or more than one Pipe), which floats on the surface of water, generally facing the oncoming waves, so located with the help of suitable moorings. An "Inlet" is integrally attached at the mouth of the Pipe. The Inlet and Pipe follow the waveform. The device works by using the advancing waves (wave progression) to push separate "Slugs" of water and air along the length of the Pipe, and converts the horizontal or progressive wave motion directly into kinetic energy. Thus, energy is extracted due to propagation of the waves, thereby building up the pressure.

The FFWEC of the present invention comprises essentially of a normally buoyant "Flexible Pipe" of adequate length, or plurality thereof, that floats on the ocean surface and adapts to the wave form, suitably moored so as to maintain the fore and aft axis generally perpendicular to the waves direction. A special "Inlet", integrally attached at the mouth of the flexible pipe ingests graduated slugs/segments of air and water into the flexible pipe, synchronous with the waves. The device works by using the advancing waves (wave progression) to push separate 'slugs' of water and air along the length of the pipe, thereby building up the pressure until it is sufficiently high to drive a turbine or pump ocean water into reservoirs, etc. Several such pipes could be grouped together; in series and or parallel, to make a wave energy form.

Several such Pipes could be grouped together, in series and/or parallel, to make a wave energy farm. The pressure and flow can be directly converted into other forms of energy, such as electricity, through conventional turbines-generators or pump ocean water into reservoirs, etc.

The "Flexible Pipe" not only absorbs energy from the crest of a wave but might also trap it from below it and in its proximity as well. This is because, as energy is progressively being extracted by the "Flexible Pipe" from a progressive wave crest, the wave energy which is below and on either side of the crest will flow in to replenish the energy which is being extracted until almost all its energy is converted. Eventually, the wave dies down.

According to the present invention, energy is extracted from the wave propagation in the horizontal plane whereas in the rest of the state of the art WEC systems mostly capture energy from the undulations of waves or surge, almost all in the vertical axis.

According to the present invention water and air enter/get sucked into the 'flexible pipe' through the "Inlet', and water gets collected in the troughs below and air trapped in the crests above, in distinct "segments", all along the length of the pipe. As waves propagate along the length of the pipe, all the segments follow the motion of the waves, with each "segment" moving along with the corresponding wave. A continuous flow of water and air is thus created.

However, the above is true only when the water in the pipe is split up into distinct segments, with the water and air being in the troughs and crests, respectively. Else, neither pressure nor flow can develop in the pipe. Therefore, the 'flexible pipe' can also be termed as a non-positive displacement wave pump.

If some resistance is applied at the outlet, the water in the troughs will get pushed up the inclines of the previous crests, consequently increasing the pressure in the pipe. If the back-pressure exceeds the total pressure head, the system stalls. The pressure is highest at the outlet, and progressively reduces up the pipe, until it becomes negative near the outlet, thus water/air get sucked in as the waves progress.

An Inlet is a floatable apparatus, flexibly attached at the throat of the "Flexible Pipe" through an "Inflexible Pipe", kept afloat by means of one plurality of buoyancy tanks, inflexible or flexible, with or without provision for controlling buoyancy thereof, either individually or collectively, so as to provide the desirable buoyancy and even ceasing operation by completely sinking or floating the apparatus.

The Inlet functions to impart some Kinetic Energy to the water slug at the time of "zero" start and subsequently to ingest graduated amount/volume of air and water, synchronous with the waves.

In case of inclement wave climate, the inlet functions to ingest only water so as to sink the flexible pipe or plurality thereof, wherein flow ceases. And whenever required, ingest only air so as to float the pipe wholly, wherein flow ceases.

The "Outlet" is a rigid pipe or a coupling, located at the end of the "Flexible Pipe", which could be further connected to a conventional hydropower generator or a reservoir, via a 'pressure chamber'. At near-shore locations, where reflective waves are expected, additional lengths of 'rigid pipes' may be attached to the Outlet for conveying the fluid flow to the generator-turbine or reservoir.

With the rest of the conditions remaining constant, an increase in the number of 'flexible pipes' and length, will enhances the flow volume and pressure, respectively.

At near-shore locations, where reflective waves are expected, additional lengths of 'rigid pipes' may be attached to the 'flexible pipe' for conveying the fluid flow to the generator housing/turbine or any other energy converter or to a reservoir.

It is important to note that in the inside of flexible pipe there are no contacting components, appendages, non-return valves or check-valves, cavities, openings, holes, diaphragms and the like which exists in the conventional energy converters. Contrary to belief the said non-return valves in the flexible pipe do not prevent the occurrence of surge or stall, hence they have not been provided in the present invention. On the contrary with the said non-return valves will hinder exchange of fluids between adjacent slugs of air/water, which might normally happen due to variation in the wave characteristics along the length of the pipe.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2(b) depicts a preferred embodiment;

DETAILED DESCRIPTION OF EXEMPLARY EMBODIMENTS OF THE INVENTION

Embodiments of the present invention will be described below specifically with reference to accompanying drawings.

A good example of the "Flexible Pipe" WEC is surfing. As a surfer rides down a wave, it follows him, but not the water. In another example, say, if a thin and flexible sheet of impermeable material is spread out on a wave train and some water is poured on it, the water will immediately get collected in the troughs and start flowing along with the waves. Now, instead of the sheet above, let us use a hollow flexible pipe, as described in paragraph below:

When the FFWEC is idling, i.e., with no load applied at the outlet, the water slugs remain in the trough part of the waves as it progresses. Whereas, under operating load the water slugs get pushed up the crest of the preceding wave all along the Flexible Pipe. This aspect has been illustrated at FIGS. 1(*a*) and (*b*), respectively.

Figure 1:
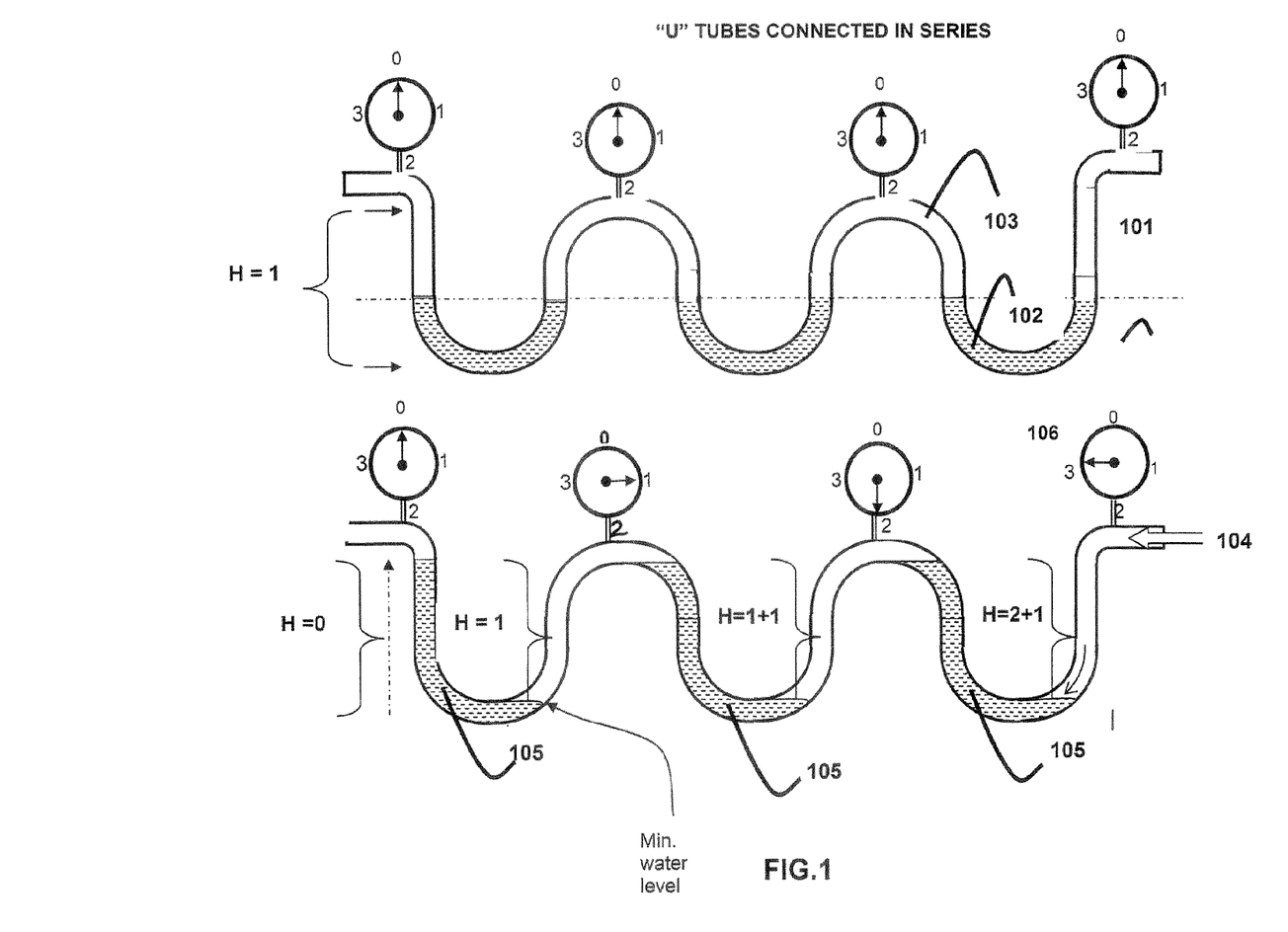
FIG. 1 depicts the principle of the present invention.

FIG. 1 of the accompanying drawings illustrates the behavior of the air and water segment in a flexible pipe arrangement. For ease of understanding, we have considered the waves to be regular curves, such as "U" tubes/manometers connected in series 101. Let us also assume that, initially, water is filled uniformly in all the trough segments of the pipe 102, with air being trapped in the crest segments 103. It can be seen that, since all the segments are connected in series, any force applied at any point on the pipe will be transmitted throughout the length of the pipe. Thus, if pneumatic pressure is applied at one end of the pipe 104, it will 'push' all the water segments up the crest slope of the proceeding wave 105. In other words, a pressure head will be created, which will be equal to the sum total of all the height displacements of the water segments.

For example, if there are 3 waves of H 1 mtr. each (water displacement in 25 each segment), the cumulative head will be=3 mtrs. (max.) 106 (which can theoretically be increased till infinity).

Now, instead of above experiment, if we consider a wave train, the opposite will happen; that is, pressure will be generated and the water/air segments will start flowing in the pipe along with the wave train. The invention exploits this characteristic of the wave motion.

The energy that can be generated by a pipe can be calculated by: $P/l=0.55 \, Hc^2 \times Ts$ per unit crest length, with He being the significant wave height and Ts the period of the wave. This is the total power per length of the wave and as this energy is being extracted from the surface, the energy that is below the wave would rise up to replace it, till almost all of the energy that existed above and below the wave is progressively extracted. Therefore, the maximum energy which the "flexible pipe" can extract will be all along its length—much more than that by a "point absorber".

During normal operating conditions, the Flexible Pipe can be made to float with the crests portion remaining above the water surface and the troughs going below it. By doing so the effective wave height can be increased from the actual wave to that assumed by the Flexible Pipe. This also helps when the actual wave heights increase. The Flexible Pipe absorbs the slack.

Figure 2:
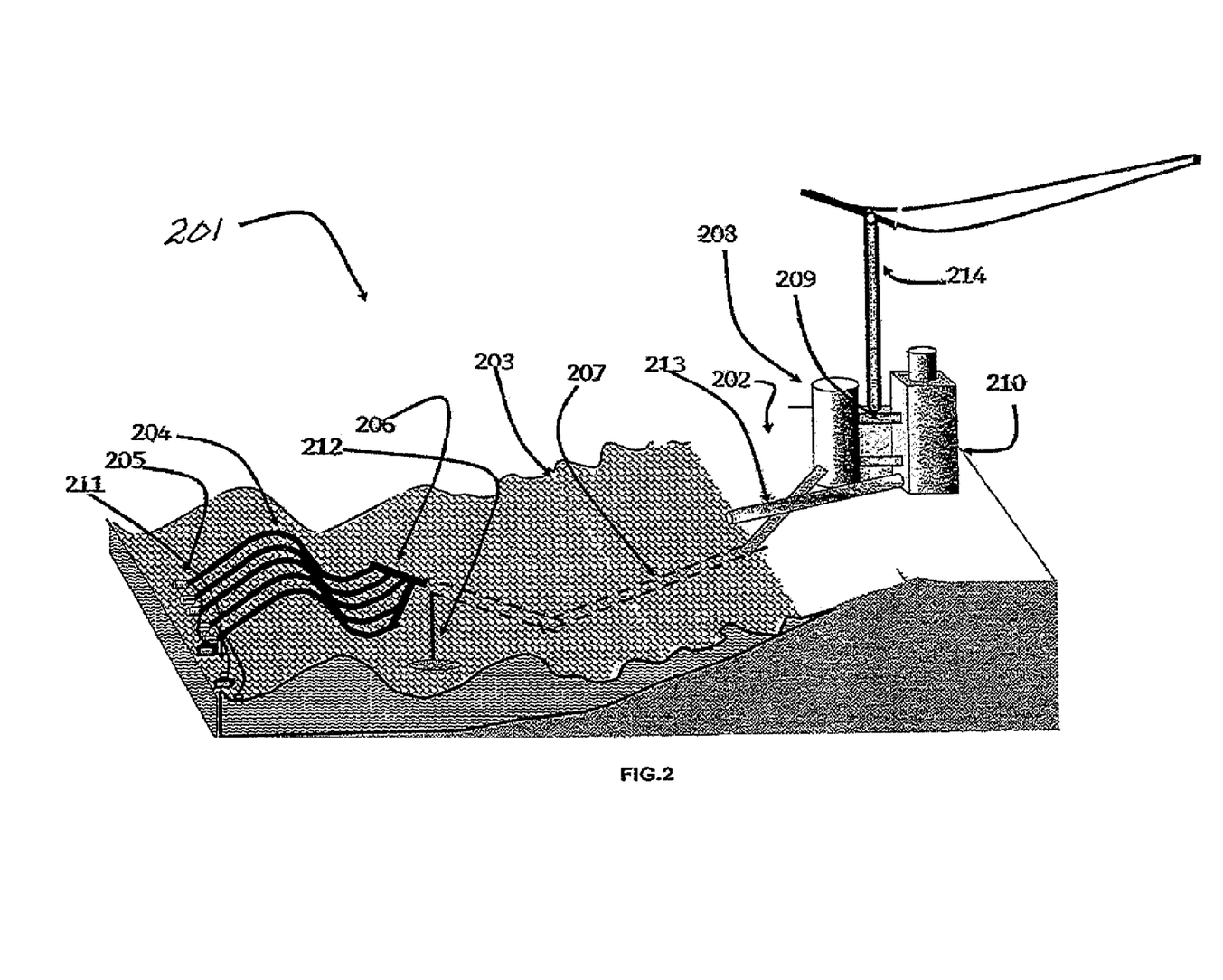
FIG. 2 is an artist's impression of free floating wave energy converter.

FIG. 2 depicts an artist's impression of the FFWEC which describes the arrangement 201 depicting the Waves moving towards the shore 202 reflected waves near shore ('turbulence' area) 203, plurality of 'Flexible Pipe'—'Air-Water "Inlet" 204-205, respectively, further connected to the 'manifold 206, further to the 'hard pipe' in the 'turbulence' area 207, terminating at the 'Air-Water Pressure Chamber' 208, with "Air' and 'Water' piping 209 connected to the generators 210 and depiction of the moorings 211, 'hard pipe supports' 212, drain pipe 213 and grid power supply 214.

FIG. 2(*b*) is an enlarged view of the preferred embodiment essentially comprising the "Flexible Pipe", Inlet 204-205 and Outlet 215 the outlet may further be connected to the other components.

Figure 3:
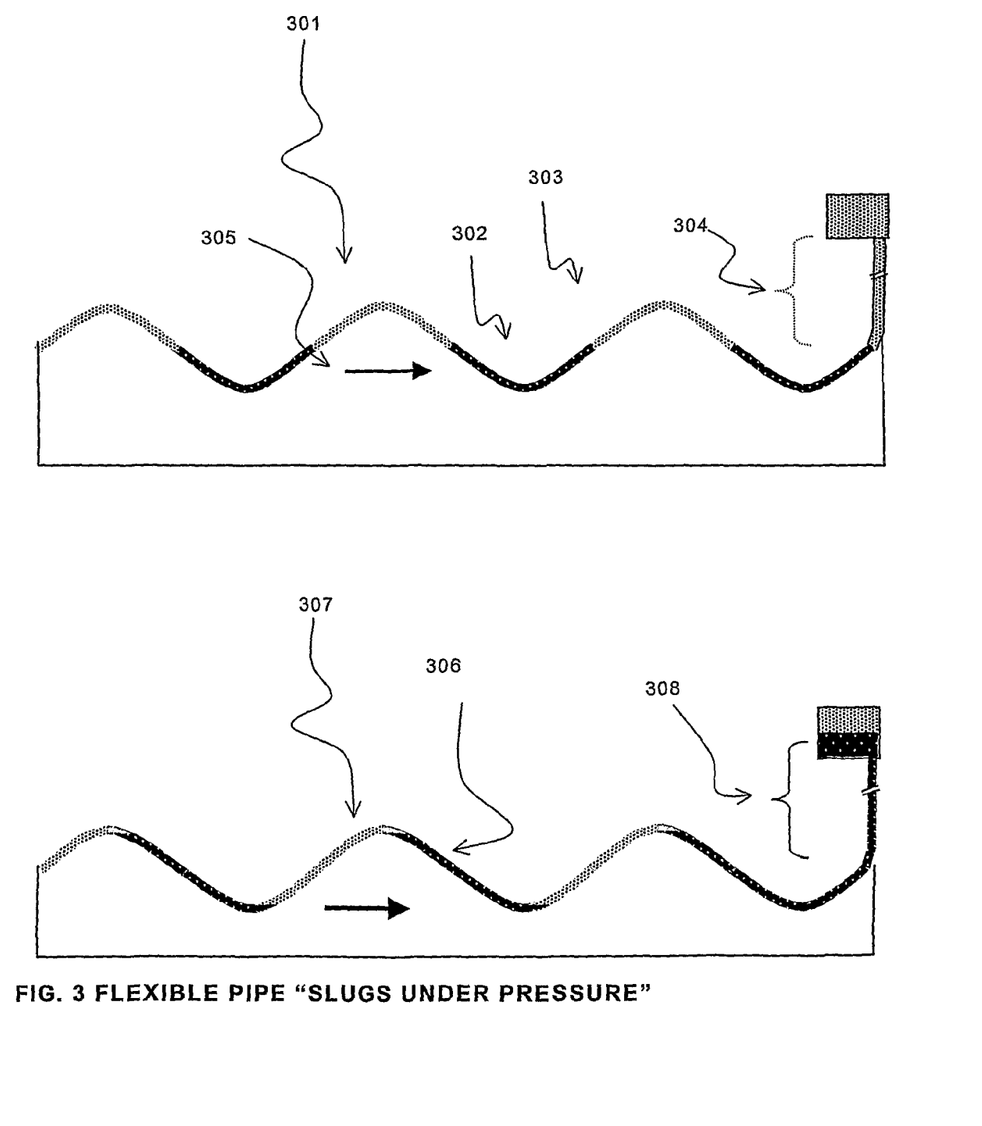
FIG. 3 shows air and water slugs under in a flexible pipe during idling and pressure flow conditions.

FIG. 3 of the present invention depicts a flexible pipe floating on waves 301, with water and air slugs in sustained flow 302 & 303. A water reservoir/tank located at an elevation towards the outlet side of the flow representing the extent of pressure-head on the flow 304, with the direction of wave motion being from left to right 305. With no back pressure (no water in the tank) the water slugs remain in the troughs 302 and when with water in the tank, the slugs are pushed up the preceding wave crests 306 & 307.

It is preferable that the air and water slugs are ingested appropriate for the operating conditions. As such, in each phase of the wave, normally water and air are alternately ingested from trough to crest and vice versa, respectively. This does not pose any problem if the load is either turned off or varied during operation.

To properly size an underwater wave energy converter, the wave power at the operating depth must be known. In general, the wave power below sea level decays exponentially by $-2\pi d/\lambda$ where d is the depth below sea level. This property is valid for waves in water with depths greater than $\lambda/2$. The equation for the relationship between depth and surface energy is: $(E(d)=E(d=SWL)*e-2\pi d/\lambda$.

Alternatively, if we consider a wave train, the opposite will happen; that is, pressure will be generated and the water/air segments will start moving in the pipe along with the wave train. This invention exploits this characteristic of the wave motion. As such, the FFWEC could be categorized as a "Linear Absorber" as opposed to the "Point Absorber" type of WEC's.

The water mass on the surface of the ocean does not move along with the waves, only the waveform does. Further, ocean waves posses two types of energy—kinetic and potential. The former is by the virtue of the horizontal progression of waveform and the latter due to heaving motion or the height difference between the wave crest and trough—wave height. Since water inside the flexible pipe flows at the wave velocity and in phase with the waves, at the time of initial start the Inlet must ingest and accelerate slugs of water from the initial "zero" relative velocity to that of the waves, both at the right moment and within a very short period of time (less than a half wave period). This is achieved by making use of either one or both the types of the wave energy mentioned above.

The FFWEC of the present invention is the only WEC to have an inherent survival capability. During severe wave climate, the "Flexible Pipes" can be simply submerged, by ingesting only water (no air). Since the pipes will essentially be made of specific gravity (SG) higher than that of water "one", they will sink when filled mostly with water. To raise them again, the pneumatic pressure that would generally be available in the "pressure chamber" would be used to purge the water out of the pipes. When the pipes resurface, the system will be at "zero start state" (with no water in the Pipes).

Before commencing operation (flow), the flexible Pipe and the Inlet assembly are to be kept empty; else the inertia of the water already collected in the Flexible Pipe will impede zero speed start. During operation, the air and water intake phases or timing can be adjusted/tuned by altering the buoyancy. In both the above cases only water is ingested to sink the flexible pipe. This is achieved by completely deflating the flexible tanks or flooding the inflexible tanks of the Inlet, as applicable. For stopping, flow the buoyancy of the Inlet buoyancy tank is increased to an extent where the mouth of the Inlet cannot enter the waves. Thus, only "air" is ingested and eventually the flow stops.

Alternatively, the buoyancy of the individual tanks can be varied such that the apparatus tilts either forward and back, thereby enabling adjustment of the water/air ingestion timing and even preventing the mouth of the Inflexible Pipe from ingesting water altogether. Consequently, the flow will stop after all the water slugs flow out. The flow must not be stopped either by cutting off the inflow or outflow. If resorted to it could cause severe damage to the Pipes. The apparatus need not essentially have any moving or contacting components. Whatever control devices required are preferably located on shore. All components of the above apparatus are made of appropriate dimensions and material.

Pressure in the Pipe is developed when some resistance is applied at the outlet; say for pumping the water up into a reservoir. Due to this, the "Slugs" of water in the troughs are pushed up the slope of the preceding crests all along the Flexible Pipe. Thus, water and air are alternately sucked in at the Inlet.

With the rest of the conditions remaining constant, an increase in the number of Pipes and length would enhance the flow volume and pressure respectively. The total pressure in a Pipe is the function of the cumulative differential pressure of all the water segments in that Pipe, but limited to the extractable wave energy acting on the Pipe, less losses due to friction and system inefficiency. Therefore, the Pipe could also be termed as a "non-positive displacement wave pump".

During normal operating conditions, the length of the Flexible Pipe can be kept more than that of the length of the wave curves. This will make the Flexible Pipe float with the troughs remaining below the water surface (crests portion remaining above). By doing so, first, the effective wave height could be increased from the actual wave to that adopted by the Flexible Pipe and second, it will also help when the wave height increases. The slack in the Flexible Pipe will cater for the increase in the wave height, which consequently increases the length of the waves.

Energy can only be optimally extracted when the air and water Slugs are and uniformly distributed in the crests troughs along the length of the flexible pipe.

Functions of the Inlet
 (a) To ingest graduated slugs of air and water in the crests and troughs of the Flexible Pipe, synchronous with the waves and at the appropriate timings.
 (b) At the time of ingestion, the wave velocity of the incident waves to be retained by the slugs.
 (c) In case of inclement wave climate, ingest only water so as to sink the flexible pipe(s), wherein flow ceases.
 (d) Whenever required, ingest only air so as to float the pipe wholly, wherein flow ceases.

Operating Conditions:
 (a) As waves pass, wave form and wave energy move rapidly forward, but not the water.
 (b) Water molecules move in an orbital motion as the wave passes.
 (c) Diameter of orbit increases with increasing wave size and decreases with depth below the water surface.
 (d) Waves occur randomly, both in terms of height and frequency.

Construction. The Inlet consists of a "Rigid" or "Inflexible" Pipe passing through the veridical plane of the fore and aft axis of a floating body, similar in construction to a buoy, and jutting sufficiently ahead of the main assembly (like a gun from the turret of a tank), facing the oncoming waves, with its rear end attached to the "Flexible Pipe" trailing behind it.

The inflexible Pipe is made to float at an appropriate height above the water surface by adjusting the buoyancy of the buoy. Therefore, it enters near the trough and exists at the crest of each passing wave.

Buoyancy Control. The Inlet is kept afloat by means of one or more number of buoyancy tanks located inside the buoy. Under normal operating conditions the mouth of the Inlet remains sufficiently above the Still Water Level. For normal operations the buoyancy tanks primarily keep the mouth of the Inlet sufficiently above the Still Water Level and make the system either sink or float completely above the waves as and when required.

The device could work without any controlling devices, under fair wave climatic conditions, with average efficiency and reliability. However, since the waves are not regular, provision for optimally controlling and regulating the air and water ingestion timing and volume are provided.

Functioning of the Inlet. As the Inlet rides the waves the extended portion of the Rigid Pipe goes through each wave from the trough to crest and then remains in air from crest to the next trough, while ingesting water and air slugs alternately. The volume of water entering the Pipe will be proportional to the distance it traverses while in the wave and air.

The slugs of water which enter the Inlet get detached from the main body of water and move through the flexible pipe in phase with the corresponding wave, while retaining the wave velocity. They get trapped in discrete segments, with alternating segments of air and water, in the crests and troughs respectively, all along the length of the Pipe. The water Slugs get pushed by the waves as they propagate from one end of the Pipe to the other.

The intake volume and timing of air and water Slugs are controlled by altering the buoyancy and/or 'up-down' tilt of the Inlet along its lateral axis. Buoyancy is increased or reduced by filling the buoyancy tanks with air or water, respectively. This enables ingestion of the Slugs according to the wave condition. Generally, water and air Slugs are alternately ingested, from trough to crest and crest to trough, respectively.

In case of severe wave climate, the Inlet is made to ingest only water. Consequently, without any air in it, the Pipe sinks (Pipe material being more than one S.G).

To make the Pipe resurface, air is pumped back through the outlet. There will be no flow in both cases, till such time the water/air ingestion cycle is recommenced. Pneumatic hoses connect the "Inlet" Buoyancy Control Tanks with the Pressure Chamber. Suitable controls are provided, generally on-shore, for regulating the buoyancy of the Inlet.

Outlet. The "Outlet" is a rigid Pipe or a coupling, located at the end of the Pipe, which could be further connected to a conventional hydropower generator or a reservoir, generally via a "Pressure Chamber". At near-shore locations, where reflective waves are expected, where energy cannot be extracted by this method, the flexible pipe transitions to rigid pipe for conveying the fluid flow to the generator-turbine or reservoir.

Surge/Stall. However, if the backpressure (pressure-head) exceeds the total pressure that is being developed by the Flexible Pipe at any given time, the system surges or stalls. In this case the continuous flow of water stops and the slugs either start oscillating between each passing wave. Reverse flow could also follow since there would be a sudden drop of pressure at the outlet. Therefore, it should be insured that the system remains within the safe operating limits. If the system stalls, it would have to be re-started.

Non-return Valves. It may be noted that non-return valves in the flexible pipe do not prevent the occurrence of surge or stall, hence have not been provided in the invention. Quite to the contrary, the devices will hinder exchange of fluids between adjacent slugs of air/water, which might normally happen due to variation in the wave characteristics along the length of the pipe.

Variation in Pressure-head. The backpressure could vary between the "stalling/surge" pressure limit and "zero".

Blocking of Inlet/Outlet. The flow should not be physically stopped either by cutting off the inflow or outflow, as this could damage the Flexible Pipes.

"Zero" Start. Before commencing operation (flow), the flexible Pipe and the "Inlet" assembly are to be kept empty (no water inside the Flexible Pipe); else the inertia of the water already collected in the Flexible Pipe would impede zero speed start. It may be recalled; the system will have to be restarted after it has "Stalled", and when re-floated from submerged condition.

Survivability. The FFWEC might be the only WEC to have an inherent survival capability. During severe wave climate, the "Flexible Pipes" could be simply submerged, by ingesting only water (no air). Since the Pipes would essentially be made of specific gravity (SG) higher than that of water "one", they will sink when filled mostly with water. To raise them again, the pneumatic pressure that would generally be available in the "pressure chamber" would be used to purge the water out of the Pipes. When the Pipes resurface, the system will be at "zero start state" (with no water in the Pipes).

No Contacting Components. The apparatus need not essentially have any moving or contacting components. The required control devices could be located on shore.

Certain design principles to achieve the desired results are discussed in the succeeding paragraphs.

Figure 4:
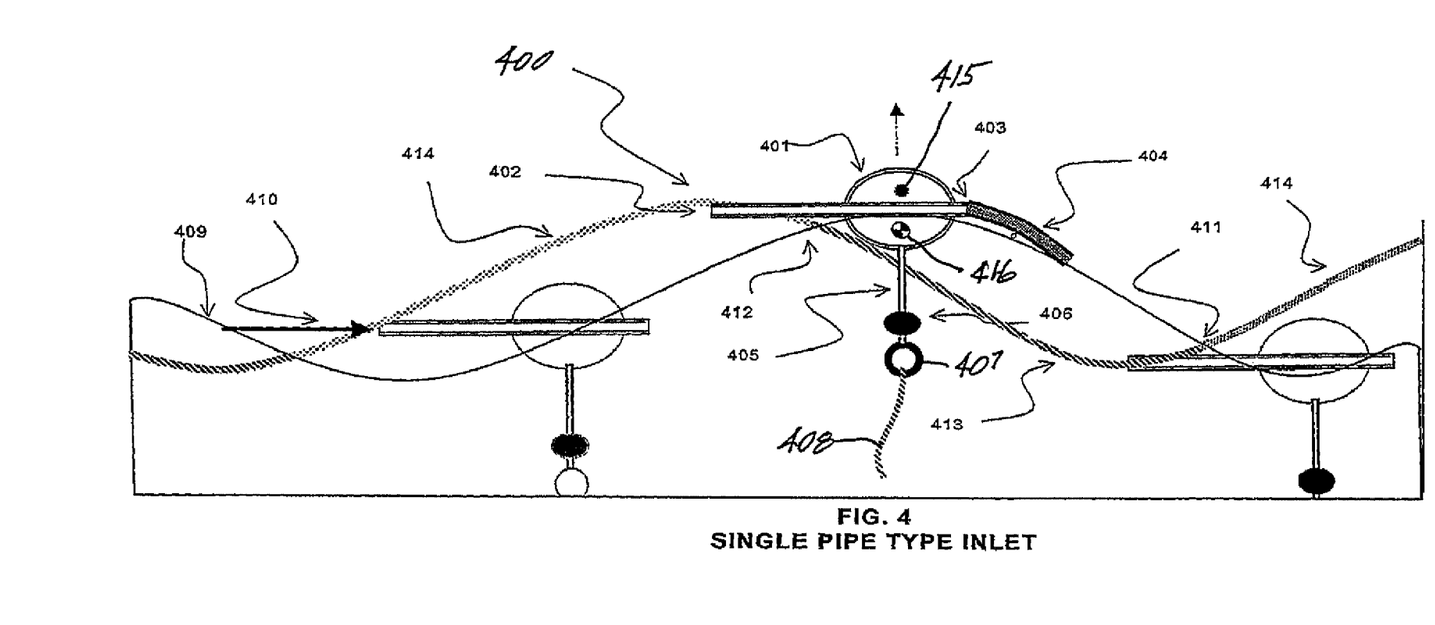
FIG. 4 shows a typical inlet.

The basic embodiment in FIG. 4 shows, the cavity being a single Inflexible Pipe 400 protruding sufficiently ahead of the buoyancy tank 401 which normally floats on the surface of water, through the mouth 402 of which both air and water enter and the outlet of which 403 being fixedly connected with the flexible pipe 404. Further, the apparatus additionally and generally consists of a suspension rod 405 with ballast 406, including mooring ring 407 and mooring line 408, all suspended vertically below it with the total weight and the fulcrum thus created providing and enhancing stability to the assembly, particularly in the vertical axis, in order to minimize the pitching motion of the assembly around its lateral axis. Furthermore, in order to minimize the torque that would be created by the moment arm formed due to the distance between the centre of pressure (CP) 409 and center of gravity (CG) 410, both being kept co-centric or nearest thereto. The Flexible Pipe, which trails the apparatus, provides the directional stability. As such, it remains nearly in upright position and rightly aligned as it floats up and down the waves.

The Inlet generally faces the oncoming waves 410. The inflexible Pipe projects sufficiently ahead of the main assembly (like a gun from the turret of a tank) and is made to float at an appropriate height above the still water level, by adjusting the buoyancy. Therefore, it enters near the trough 411 and exists at the crest 412 of the waves as they pass (for explaining the sequence, the wave in the drawing is shown as stationary while the Inlet is shown in three positions, moving from right to the left). When a wave strikes the mouth of the Inflexible Pipe the water which enters it is separated from the main water body, while continuing to move through it at the same wave velocity. The water phase commences from the trough of an oncoming 413 wave and lasts till its crest and the air phase from thereon till the next trough 414. Thus, alternating intake of water and air slugs is appropriately synchronized with the waves.

The above apparatus has no controlling devices, but can yet function 5 under fair wave climatic conditions, with average efficiency and reliability.

In another embodiment, added to the above assembly is a provision for controlling and regulating the buoyancy, whereby the air and water ingestion timing and volume can be controlled to a certain degree, besides making it possible to sink the apparatus/system in bad weather or stop operations by cutting off the water intake and totally float the flexible pipes. The modification is described in detail below.

Figure 5:
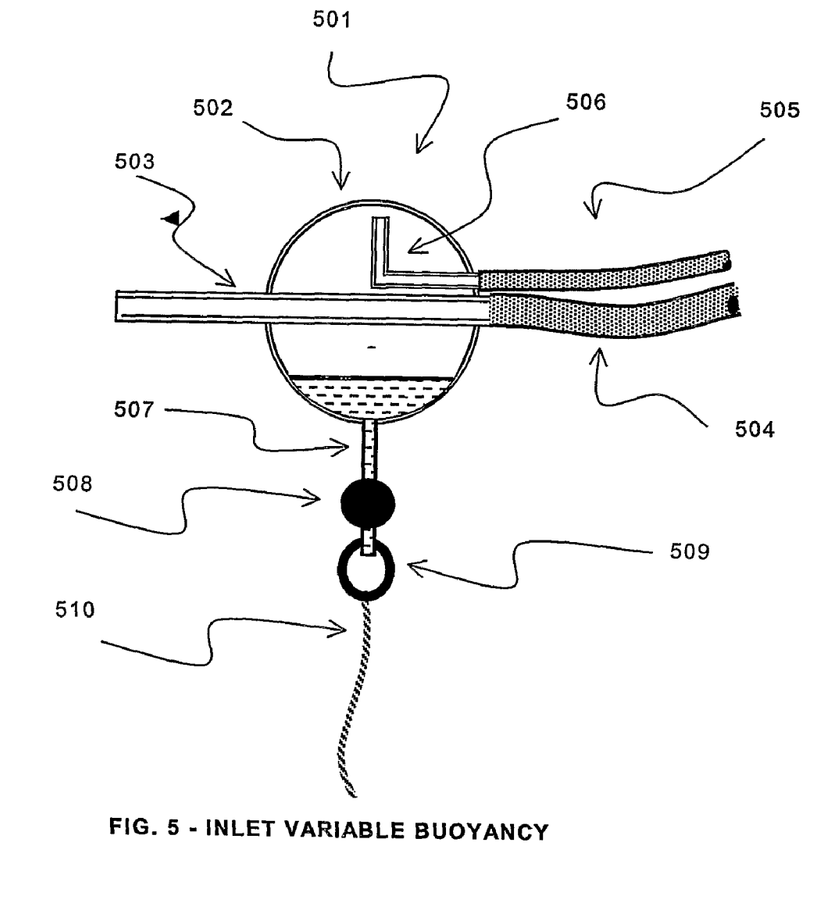
FIG. 5 shows inlet with buoyancy control.

FIG. 5, illustrates the above embodiment comprising of an inlet apparatus 501, the buoyancy tank 502, having a pneumatic duct 506, connected through a hose 505 to the pressure chamber with control devices preferably located thereat, for varying the pneumatic pressure in the buoyancy tank. By varying the pneumatic pressure in the buoyancy tank, water is pushed in/out through a water breathing tube 507, the top end of which is fixedly attached to the bottom of the buoyancy tank and the lower end opening into the sea below, consequently varying the Inlet buoyancy, thereby controlling the air and water intake timing and volume. The rest of the arrangements of this embodiment remain similar to those described in FIG. 4 above.

Figure 6:
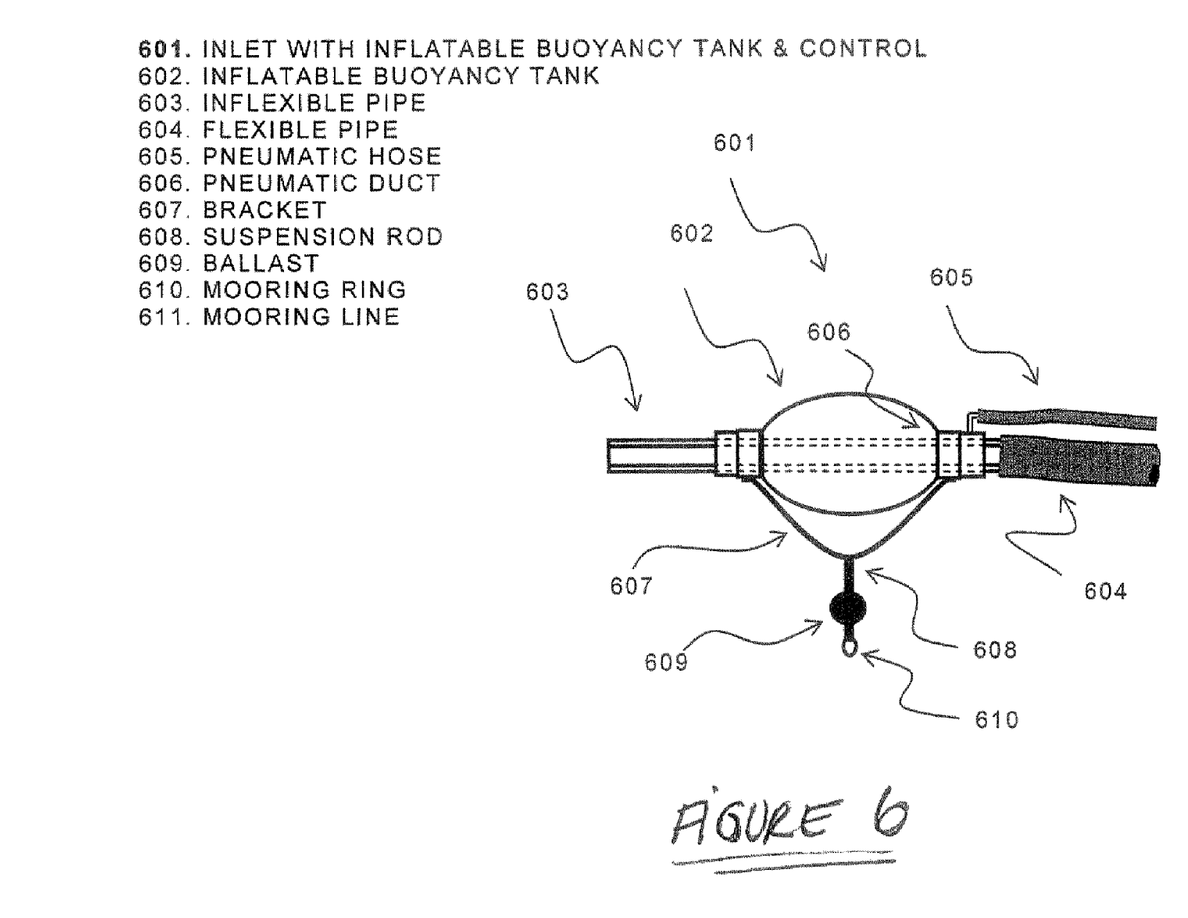
FIG. 6 shows inlet with inflatable buoyancy tank and control.

In another embodiment which is illustrated by FIG. 6, the buoyancy tank 602 being inflatable and directly connected with the pneumatic hose 605 as above, but without the air duct and water breathing tube (the rest of the arrangements being similar to the previous embodiment described in the above paragraph). As can be appreciated, the buoyancy can be varied by inflating—deflating the inflatable buoyancy tank.

Figure 7:
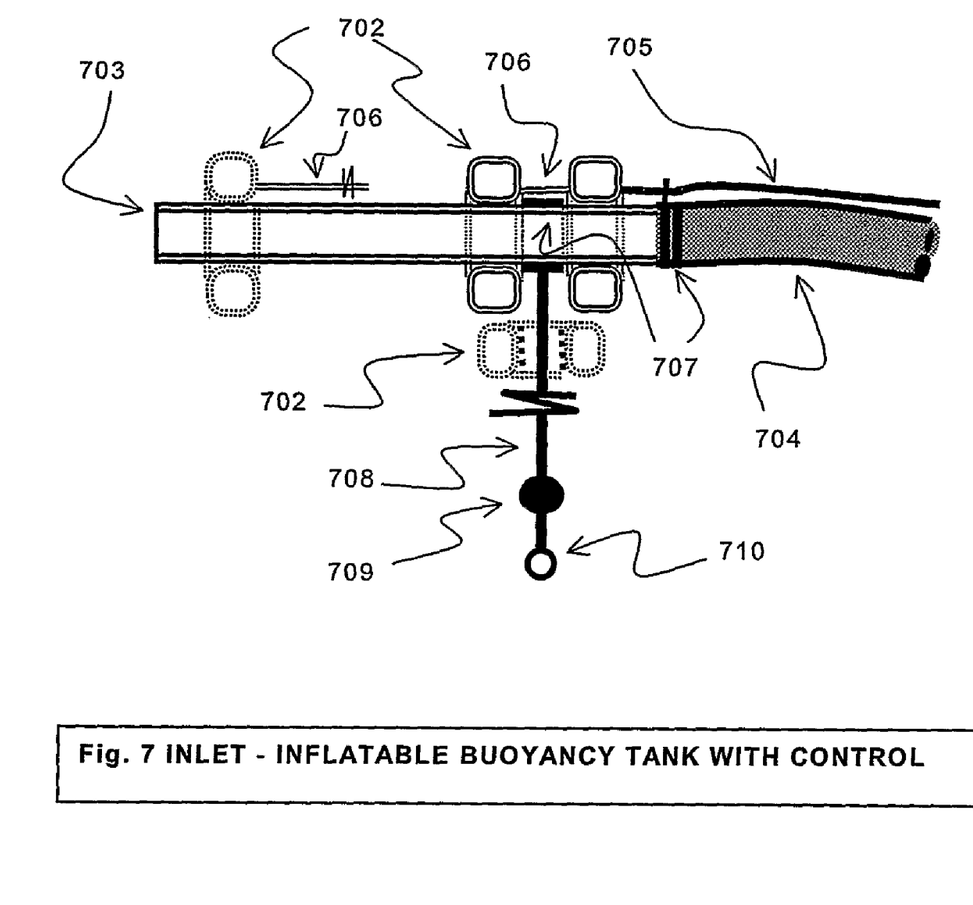
FIG. 7 shows inlet with plurality of inflatable buoyancy tanks and control.

In yet another embodiment illustrated by FIG. 7, two or more inflatable buoyancy tanks 702, connected individually, in groups or jointly through respective hoses 705 and 706 with the "pressure chamber", which is normally shore-based, the pneumatic pressure and controls and switching devices generally installed at the pressure chamber, the variable buoyancy tanks suitably arranged on the Inlet apparatus whereby the angle of rotation around the lateral axis of the Inlet apparatus and its buoyancy, can be controlled.

The inflatable variable buoyancy tanks could be in the shape of doughnuts, as shown in the diagram, spherical or of any other suitable shape as in FIG. 6 and its principle operation is also similar to it.

In the above embodiment, plurality of rigid buoyancy tanks similar in construction to the one explained at FIG. 5 above are used instead of the flexible buoyancy tanks.

Advantages of the present invention: From the foregoing, it could be appreciated that the FFWEC could offer several advantages over the state of the art wave energy conversion systems. These are as follows:

The simplest WEC concept comprising of no contacting parts

Least Cost/KW (only flexible pipes absorb the wave energy).

Utilizes components and sub-systems that are readily available (we only need to select the most suitable components).

The technologies used are well matured (mostly 'brick and mortar—minimum hi-tech).

Has very high survivability factor under stormy conditions (it submerges, like a submarine).

Large-scale deployment possible, within a short time period utilizing local resources.

Highly cost competitive—Design & Development, Capital, O&M and Production, etc. as compared with the existing state of the art WEC systems and comparable with the conventional electricity generating systems.

Very easy to install/un-install and maintain. Only the 'flexible pipes' and rigid pipes are to be laid on the ocean. The same being very light in weight can be implemented with the help of standard vessels and crew even on a very large scale.

Conventional mooring system.

The concept is rather simple. Involved R&D is not envisaged, i.e. fast tracking—concept evaluation and prototype testing through to commercial deployment.

Does not pose threat to marine life—eco-friendly.

The invention is technically feasible and commercially viable.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A wave energy converter comprising:
   an elongated flexible pipe extending between an inlet end and an outlet end;
   a rigid inlet pipe having an open inlet end and an outlet end connected in fluid communication with said inlet end of said flexible pipe;
   a buoyancy tank attached to said inlet pipe for floating said inlet pipe in a body of water; and
   a pressure chamber/accumulator connected in fluid communication with said outlet end of said flexible pipe for accumulating a pressure whereby when said inlet pipe and said flexible pipe are positioned in the body of water along a path of propagation of waves with said inlet end of said inlet pipe receiving the waves, said buoyancy tank orients said inlet pipe causing alternating slugs of water and air enter said inlet end of said inlet pipe and move through said flexible pipe to said pressure chamber/accumulator in phase with the waves.

2. The wave energy converter according to claim 1 including a water breathing tube having a top end connected in fluid communication with a bottom of an interior of said buoyancy tank and a lower end opening into the body of water.

3. The wave energy converter according to claim 2 including a pneumatic duct having a top end positioned in a top of said interior of said buoyancy tank and a pneumatic hose connecting said pneumatic duct with said pressure chamber/accumulator for varying a pneumatic pressure In said interior of said buoyancy tank.

4. The wave energy converter according to claim 1 including a rigid outlet pipe having an inlet end connected in fluid communication with said outlet end of said flexible pipe and an outlet end connected in fluid communication with said pressure chamber/accumulator, said outlet pipe being positioned in a turbulence area near a shore of the body of water.

5. The wave energy converter according to claim 1 wherein said buoyancy tank is inflatable and is connected to a pneumatic pressure source through a pneumatic hose.

6. The wave energy converter according to claim 1 including a generator connected to said pressure chamber/accumulator for generating electricity.

7. The wave energy converter according to claim 1 including at least another buoyancy tank attached to said inlet pipe and means for varying a buoyancy of said buoyancy tanks to adjust lengths of the alternating slugs of water and air entering said inlet pipe.

8. The wave energy converter according to claim 1 including a suspension rod with a ballast extending from a bottom of the said buoyancy tank for providing stability in a vertical axis to enable relative motion between a horizontal component of the waves and said open inlet end of said inlet pipe.

9. The wave energy converter according to claim 8 wherein said suspension rod with said ballast extends from said bottom of said buoyancy tank aft of a center of floatation of said buoyancy tank and said inlet pipe causing drag while said inlet pipe moves up and down the waves, the drag causing said open inlet end of said inlet pipe to tilt upwardly while travelling up the waves and to tilt downwardly while travelling down the waves.

10. The wave energy converter according to claim 8 wherein said suspension rod with said ballast extends from said bottom of said buoyancy tank ahead of a center of floatation of said buoyancy tank and said inlet pipe causing drag while said inlet pipe moves up and down the waves, the drag causing said open inlet end of said inlet pipe to tilt downwardly while travelling up the waves and to tilt upwardly while travelling down the waves.

11. A wave energy converter comprising:
    at least two elongated flexible pipes each extending between an inlet end and an outlet end;
    at least two rigid inlet pipes each having an open inlet end and an outlet end connected in fluid communication with said inlet end of an associated one of said flexible pipes;
    at least two buoyancy tanks each attached to an associated one of said inlet pipes for floating said inlet pipes in a body of water;
    a manifold connected in fluid communication with said outlet end of each of said flexible pipes; and
    a pressure chamber/accumulator connected in fluid communication with said manifold and providing a pressure head, whereby when said inlet pipes and said flexible pipes are positioned in the body of water along a path of propagation of waves with said inlet ends of said inlet pipes receiving oncoming waves, said buoyancy tanks orient said inlet pipes causing alternating slugs of water and air enter said inlet ends of said inlet pipes and move through said flexible pipes to said manifold and said pressure chamber/accumulator in phase with the waves.

12. The wave energy converter according to claim 11 including a rigid outlet pipe having an inlet end connected in fluid communication with said manifold and an outlet end connected in fluid communication with said pressure chamber/accumulator, said outlet pipe being positioned in a turbulence area near a shore of the body of water.

13. The wave energy converter according to claim 11 including a generator connected to said pressure chamber/accumulator for generating electricity.

14. The wave energy converter according to claim 11 including at least another buoyancy tank attached to each of said inlet pipes and means for varying a buoyancy of said buoyancy tanks to adjust lengths of the alternating slugs of water and air entering said inlet pipes.

15. A wave energy converter comprising:
    an elongated flexible pipe extending between an inlet end and an outlet end;
    a rigid inlet pipe having an open inlet end and an outlet end connected in fluid communication with said inlet end of said flexible pipe;

a buoyancy tank attached to and extending around said inlet pipe for floating said inlet pipe in a body of water and for tilting said inlet pipe vertically; and a pressure chamber/accumulator connected in fluid communication with said outlet end of said flexible pipe and providing a pressure head, whereby when said inlet pipe and said flexible pipe are positioned in the body of water along a path of propagation of waves with said inlet end of said inlet pipe receiving oncoming waves, said buoyancy tank orients said inlet pipe causing alternating slugs of water and air enter said inlet end of said inlet pipe and move through said flexible pipe to said pressure chamber/accumulator in phase with the waves.

16. The wave energy converter according to claim 15 including a suspension rod extending from a bottom of said buoyancy tank for mooring said buoyancy tank in the body of water.

17. The wave energy converter according to claim 16 wherein said suspension rod is a water breathing tube having a top end connected in fluid communication with a bottom of an interior of said buoyancy tank and a lower end opening into the body of water.

18. The wave energy converter according to claim 15 including a pneumatic duct positioned in a top of an interior of said buoyancy tank and a pneumatic hose connecting said pneumatic duct with said pressure chamber/accumulator for varying a pneumatic pressure in said interior of said buoyancy tank.

19. The wave energy converter according to claim 15 wherein said buoyancy tank is inflatable and is connected to a pneumatic pressure source through a pneumatic hose.

20. The wave energy converter according to claim 15 including at least another buoyancy tank attached to said inlet pipe and means for varying a buoyancy of said buoyancy tanks to adjust lengths of the alternating slugs of water and air entering said inlet pipe.

* * * * *